United States Patent [19]
Heikkinen et al.

[11] Patent Number: 5,173,028
[45] Date of Patent: Dec. 22, 1992

[54] SEMITRAILER

[75] Inventors: Jaakko Heikkinen, Kello; Markku Huttunen, Haukipudas; Pentti Moilanen, Oulu, all of Finland

[73] Assignee: Rautaruukki Oy, Oulu, Finland

[21] Appl. No.: 768,873

[22] PCT Filed: May 21, 1990

[86] PCT No.: PCT/FI90/00141

§ 371 Date: Oct. 23, 1991

§ 102(e) Date: Oct. 23, 1991

[87] PCT Pub. No.: WO90/14248

PCT Pub. Date: Nov. 29, 1990

[30] Foreign Application Priority Data

May 19, 1989 [FI] Finland .................. 892419
Jun. 20, 1989 [FI] Finland .................. 893020

[51] Int. Cl.⁵ .................. B60P 1/16
[52] U.S. Cl. .................. 414/498; 414/495; 414/480; 414/475; 414/483; 414/346; 280/425.2; 280/441.1; 280/441.2
[58] Field of Search .................. 414/474, 475, 476, 480, 414/481, 482, 483, 495, 498, 499, 500, 401, 346, 497, 340, 343, 345; 298/8 R; 280/407.1, 408, 418.1, 423.1, 425.1, 425.2, 82, 83, 441.1, 441.2

[56] References Cited

U.S. PATENT DOCUMENTS

| | | |
|---|---|---|
| 2,171,707 | 9/1955 | Martin . |
| 3,163,306 | 12/1964 | Bennett et al. .................. 414/498 |
| 3,208,615 | 9/1965 | Wolf . |
| 3,235,285 | 2/1966 | Tenenbaum et al. .......... 414/401 X |
| 3,303,615 | 2/1967 | Jones . |
| 3,719,392 | 3/1973 | Russell .................. 414/482 X |
| 4,051,968 | 10/1977 | Massey . |
| 4,746,261 | 5/1988 | Landoll et al. . |
| 5,000,645 | 3/1991 | Polojarvi .................. 414/498 X |

FOREIGN PATENT DOCUMENTS

| | | |
|---|---|---|
| 2319652 | 12/1973 | Fed. Rep. of Germany . |
| 2628060 | 1/1977 | Fed. Rep. of Germany . |
| 3027117 | 2/1982 | Fed. Rep. of Germany . |
| 2505271 | 11/1982 | France .................. 414/482 |
| 76966 | 9/1988 | France . |
| 26625 | 12/1963 | German Democratic Rep. .................. 414/475 |
| 1031603 | 6/1966 | United Kingdom .......... 414/346 |
| 1450337 | 9/1975 | United Kingdom . |
| 1473328 | 5/1977 | United Kingdom . |

Primary Examiner—Frank E. Werner
Attorney, Agent, or Firm—Merchant & Gould, Smith, Edell, Welter & Schmidt

[57] ABSTRACT

The invention relates to a semitrailer (1) comprising devices (6) for shifting a load, such as a container (9), to the support of the trailer (1) and away from the support thereof; as well as devices (3) for shifting the bogie (2) in the lengthwise direction of the trailer. According to the invention, the trailer (1) comprises devices (10; 12) for raising and lowering both the front end (1a) and rear end (1b) of the trailer. By employing the said devices, the front and rear ends of the trailer can be raised and lowered irrespective of each other in order to load and unload the trailer.

8 Claims, 3 Drawing Sheets

SEMITRAILER

The invention relates to the semitrailer defined in the introductory section of patent claim 1.

In the prior art there is known, from the patent publications FI 77,187 and U.S. Pat. No. 3,303,950 a trailer, which is at the front end directly attached to the tractor At the loading and unloading stages, the support legs provided at the rear end of the trailer are lowered to the ground, and the rear bogie of the trailer is shifted to the front end thereof, near the tractor. Thereafter the rear end of the trailer is lowered down to the ground by the aid of the support legs. The trailer is then ready to be loaded or unloaded.

A problem with the described trailer is that the wheels of the rear bogie must be of small size. On this condition the rear end of the trailer can be lowered against the ground while loading and unloading the trailer. Ordinary rear bogie arrangements can thus not be applied to this trailer. Owing to the small size of the rear bogie, its load bearing capacity also is weaker than normal.

From the U.S. Pat. No. publication 3,606,059 there is known a trailer which also is attached directly to the tractor at its front end. The trailer comprises two turnably interconnected members: the trailer proper and an auxiliary frame, whereby the trailer proper and the tractor are connected to each other. For loading or unloading, the wheel bogie is shifted from the rear end of the trailer to its front end, under the auxiliary frame, whereafter the trailer proper can be turned, at its articulation, so that its rear end rests against the ground.

A problem with the said trailer is its two-part structure; it is heavy in structure and expensive in production. Another problem is that the inclination angle of the trailer while loading and unloading becomes large and may cause trouble in handling the load. Yet another problem is that such a trailer is suitable only for handling comparatively short loads or pallets.

From the Finnish patent publication FI 57,718 there is known a trailer which is at its front end directly attached to the tractor. While loading and unloading the trailer, the bogies are shifted from the rear end of the trailer to its front end, and the tractor is pulled, by means of the bogie, from under the trailer. Thus the trailer remains in the support of the rear bogie at its front end.

A problem with the described trailer is that the tractor must be provided with special auxiliary devices which disengage the tractor from the trailer during the final stage of the shifting of the rear bogie. Another problem is that the shifting of the trailer in situations when the trailer is in the loading or unloading position, with its rear lowered down, is troublesome.

From the U.S. Pat. No. publication 4,746,261 there is known a trailer where during loading and unloading, the rear bogie is shifted, from its normal rear position, halfway towards the front, whereafter the rear end of the trailer is turned against the ground by means of a hauling device. The said device is a hydraulic cylinder provided in connection with the front end of the trailer and the coupling members of the tractor. The trailer is loaded by pulling the load to the support of the trailer by means of a pulling device, which is connected to the front end of the trailer.

A problem with the above described trailer is that it is suitable for handling only such loads which are lifted from the ground to the trailer, or lowered to the ground from the trailer. Moreover, any unevenness or softness in the ground or other underlaying surface causes trouble.

The object of the present invention is to eliminate the above mentioned drawbacks.

The semitrailer of the invention is characterized by the novel features enlisted in the patent claim 1.

The semitrailer of the invention comprises means for shifting the load, such as a container, to the support of the trailer, and away from the support thereof, as well as means for shifting the bogie in the lengthwise direction of the trailer. It is characteristic of the invention that the semitrailer is provided with members for raising and lowering both the front and rear ends of the trailer, by means of which members the front and rear ends of the trailer can be raised and lowered irrespective of each other for loading or unloading the trailer.

In a preferred embodiment of the semitrailer, the means for raising and lowering the front end of the semitrailer include a lever arm, the free end whereof is directed towards the front end of the trailer, and at least one power unit, such as a pressure fluid cylinder, which is located in connection to the trailer, on the opposite side of the articulation point of the lever arm, with respect to the said lever arm. By means of this arrangement, the free end of the lever arm together with the coupling member connected thereto, can be placed in the vicinity of the front end of the trailer, and the length of the lever arm does not necessarily set any restrictions to the structure.

In another preferred embodiment of the semitrailer, the second articulation point of the pressure fluid cylinder, which is connected to the lever arm, is located at a distance from the articulation point of the lever arm and above it while the lever arm is in its high position.

In another preferred embodiment of the semitrailer, the distance between the articulation points is essentially shorter than the total length of the lever arm.

In another preferred embodiment of the semitrailer, the pressure fluid cylinder and the lever arm are in the high position located successively and at least roughly parallelly.

In another preferred embodiment of the semitrailer, the free end of the lever arm is in its high position arranged to be supported against the trailer, particularly against the support member arranged in connection with the trailer.

In another preferred embodiment of the semitrailer, the means for raising and lowering the rear end of the semitrailer comprise support legs, which are provided with leg members attached to the articulation point at a distance from the rear end of the trailer, which distance roughly corresponds to the total length of the leg members, so that the free ends of the leg members are in the high position located in the immediate vicinity of the rear edge of the rear end of the trailer; and at least one power unit, such as a pressure fluid cylinder which is located in connection with the trailer, on the opposite side of the articulation point with respect to the support legs.

In another preferred embodiment of the semitrailer, the second articulation point of the pressure fluid cylinder, which is connected to the support legs, is located at a distance from the articulation point of the leg members and above it while the leg members are in the high position.

In another preferred embodiment of the semitrailer, the distance between the articulation points is essentially shorter than the total length of the leg member.

In another preferred embodiment of the semitrailer, each pressure fluid cylinder and leg member are in the high position located successively, and at least roughly parallelly.

In yet another preferred embodiment of the semitrailer, each leg member is arranged in the beveled part at the rear end of the trailer.

In yet another preferred embodiment of the semitrailer, the free end of each leg member is arranged to be supported against the trailer in its high position.

In another preferred embodiment of the semitrailer, at the rear end of the semitrailer there are provided support members, against which each leg member is arranged to be supported in the high position.

In yet another preferred embodiment of the semitrailer, to the free end of each leg member there is turnably attached a bogie.

In yet another preferred embodiment of the semitrailer, the wheels of the bogie are located at least partly below the chassis structure while the leg members are in the high position.

An advantage of the invention is that an ordinary tractor is suited for moving the trailer of the invention. Thus there is not needed any auxiliary equipment in the trailer.

Another advantage of the invention is that the rear bogie of the trailer also can be conventional in structure. Special devices are naturally needed for shifting and locking into place the rear bogie.

Furthermore, owing to the invention the trailer can be connected to the tractor during the loading and unloading.

A further advantage of the invention is that the trailer is easy to move and the steering response of the vehicle-trailer combination is good, also when the rear end of the trailer is lowered to the ground in the loading and unloading positions.

Owing to the invention, the height of the front end of the trailer and/or lengthwise inclination angle can be adjusted according to the needs.

Another advantage of the invention is that the structure of the lever arm provided at the front end of the trailer is fairly light, and does not remarkably increase the weight of the trailer.

Yet another advantage of the invention is that the lever arm provided in the trailer fits in a relatively small space.

Another further advantage of the invention is that the power unit of the lever arm provided in the trailer is advantageously arranged so that it is protected by the trailer chassis.

Furthermore, owing to the invention the lever arm achieves a large torque, particularly at the beginning of the raising motion of the front end of the trailer. This is an important aspect while raising a loaded trailer at the front end.

Moreover, owing to the invention possible sideways shifts of the trailer are prevented by articulating the lever arm firmly in connection with the trailer.

Another advantage of the invention is that the effects of any unevenness in the underlaying surface can be reduced by suitably lifting the rear end of the trailer, supported by the support legs, gradually during the loading process.

Yet another advantage of the invention is that the power units, such as the pressure fluid cylinders, are placed in connection with the support legs so that there is created a large torque at the beginning of the lifting motion of the rear end of the trailer, while hauling the trailer plus the load thereon.

Yet another advantage of the invention is that the wheels or similar members provided at the free ends of the support legs serve in the high position, in connection with the rear end of the trailer and particularly in connection with the rear beam, as transfer wheels whereby the shifting of the trailer to under the load is carried out Without trouble When the rear end of the trailer is lowered to the ground, in the loading position.

Another advantage of the invention is that the sinking to the ground of the wheels provided in connection to the support legs during the loading process can be compensated by raising the rear end of the trailer, supported by the support legs, gradually up while the loading proceeds, and if necessary, one leg can be raised more than the other.

Yet another advantage of the invention is that the support legs of the trailer fit in a relatively small space.

Another further advantage of the invention is that the pressure fluid cylinders of the trailer are ordinary in structure, easily available and economical in price.

In addition, owing to the invention the pressure fluid cylinders connected to the support legs are protected by the trailer chassis, so that they are not susceptible to damage.

Furthermore, owing to the invention the rear end of the trailer forms a compact and simple unit.

Moreover, the invention enables the shifting of the trailer, by means of bogies, both in the high and low positions of the support legs.

Yet another advantage of the invention is its versatility and suitability to various loading and unloading conditions.

A further advantage of the invention is the simple, solid and reliable structure of the trailer.

In the following the invention is explained in more detail with reference to the appended drawings, where.

Figures 1, 2, 3:
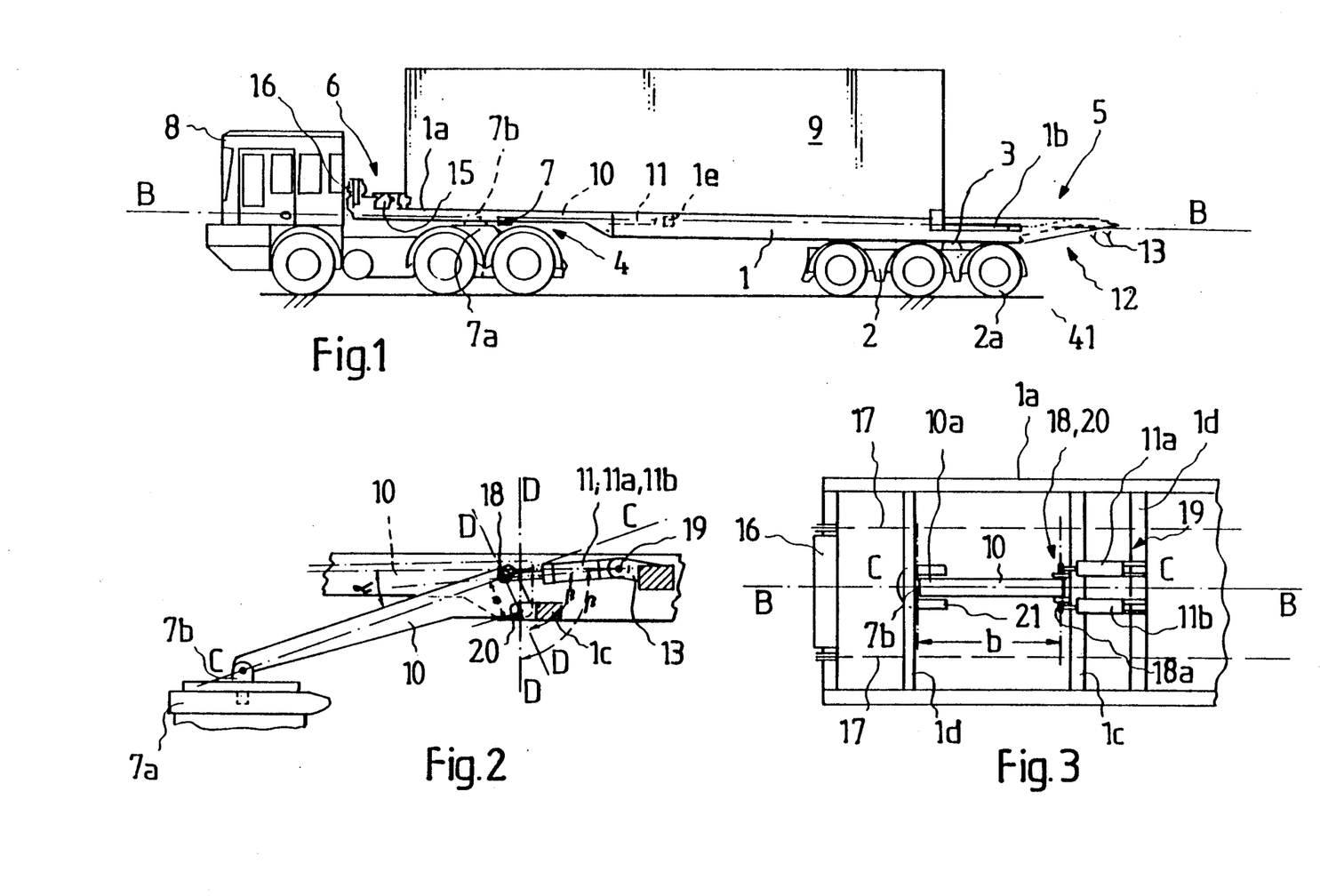
FIG. 1 illustrates a combination of vehicle and semitrailer, where the semitrailer conforms to the present invention.
FIG. 2 is a detailed illustration of the means for raising and lowering the front end of the semitrailer, seen from the side in partial cross-section.
FIG. 3 is a detailed illustration of the means for raising and lowering the front end of the semitrailer, seen from the top.

In FIG. 1, in connection to the vehicle, i.e. the tractor 8, there is provided a semitrailer 1 of the present invention. The semitrailer 1 comprises a bogie 2, which in this case includes three axle assemblies; means 3 for shifting the bogie 2 in the lengthwise direction of the trailer in between the rear end 1b and the front end 1a; means 4 for raising the front end 1a of the trailer, in the support of the tractor 8; means 5 for raising and lowering the rear end 1b of the trailer; means 6 for shifting a load, such as a container 9, to and from the support of the trailer 1; and coupling means 7 for connecting the tractor 8 and the trailer 1.

The means 3 for shifting the bogie 2 in the lengthwise direction B—B of the trailer include for instance guides whereto the bogie 2 is attached, and shifting means, such as a fluid motor and connected power transmission unit, for instance a chain plus folding wheel 3a (FIG. 5), whereby the bogie 2 can be moved along the guides of the trailer 1.

The means 4 for raising the front end 1a of the semi-trailer 1 in the support of the tractor 8 include a lever arm 10, which is turnably attached to the front end 1a of the trailer, and a device, for instance at least one pressure fluid cylinder 11, for turning the lever arm 10. The free end 10a of the lever arm is detachably connected to the tractor 8.

The means 5 for raising and lowering the rear end 1b of the trailer 1 include support legs 12 provided with wheels 13, which support legs are attached to the rear end 1b of the trailer, and a device, for instance at least one pressure fluid cylinder 14, for turning the support legs 12. The support legs 12 are turnable, by means of the cylinders 14, from their high position in the vicinity of the trailer chassis 1, to the low position against the ground or other underlaying surface, for raising and lowering the rear end 1b of the trailer.

The means 6 for shifting the container 9 to and/or from the support of the trailer 1, comprise a transfer cradle 15, a fluid motor 16 and transmission chains 17. The transfer cradle 15 is shifted, supported by the chassis of the trailer 1, from the front end 1a to the rear end 1b and back, by means of the fluid motor 16 and the transmission chains 17. The transfer cradle 15 is attached to the container 9, and thereby the container 9 is pulled to the support of the trailer 1, and respectively away from the support of the trailer 1.

The coupling means 7 for connecting the tractor 8 and the trailer 1, include a drawhead 7a or a similar connecting member on the side of the tractor 8, and a drawbar or other such connecting member 7b on the side of the trailer 1. These coupling members 7; 7a, 7b can be members with conventional structure. The coupling member 7b is turnably fastened to the free end 10a of the lever member 10. The turning of the coupling member 7b is advantageously carried out in a direction parallel to the vertical plane passing via the lengthwise axis C—C of the lever arm 10. By means of the coupling member 7b, the trailer 1 is detachably connectable to the drawhead 7a of the tractor 8.

The means 4 for raising the front end 1a of the trailer 1 are explained with reference to the embodiments of FIGS. 2 and 3.

The lever arm 10 is an elongate, bar-like member. In its high position, the lever arm 10 is at least roughly parallel to the lengthwise axis B—B of the trailer. Moreover, the free end 10a of the trailer is directed towards the front end 1a of the trailer 1. The lever arm is turnably attached to the vicinity of the front end 1a of the trailer 1, so that it can be turned from the high position in the vicinity of the chassis of the trailer 1 to an inclined angel $\alpha$ with respect to the trailer 1, in which case the front end 1a of the trailer rises up from the tractor level.

The size of the angle $\alpha$ may vary, its maximum size being advantageously 30°...40°.

To the lever arm 10 there is connected a device for turning the same. In this case the turning device is formed of two pressure fluid cylinders, advantageously hydraulic cylinders 11; 11a, 11b. The hydraulic cylinders 11a, 11b and the lever arm 10 are in the high position located successively and roughly parallelly, as is apparent for instance from FIGS. 2 and 3.

The hydraulic cylinders 11; 11a, 11b are attached, when seen from the side, to the lever arm 10 at the point 18, and to the chassis of the trailer 1, for instance to the transversal beam 1c, at the point 19. The hydraulic cylinders 11a, 11b are turnably attached, at the articulation point 18, by means of the turning axis 18a to the lever arm 10. The articulation point 18 of the hydraulic cylinders 11a, 11b and the lever arm 10, and respectively the articulation point 20 of the lever arm 10 and the chassis of the trailer 1, for instance the transversal beam 1c, are arranged at a distance a from each other when seen from the side of the trailer in FIG. 2. The line D—D passing through the articulation points 18, 20 is at least roughly vertical to the main lengthwise axis C—C of the lever arm 10. The distance a between the two articulation points 18, 20 is essentially shorter than the total length b of the lever arm.

The hydraulic cylinders 11; 11a, 11b are advantageously short standard-type cylinders. They are installed in connection with the lever arm 10 and the chassis of the trailer 1, so that the torque directed to the lever arm 10 is as large as possible, and distributed evenly throughout the whole turning range, from the high position to the inclined angle $\alpha$.

The free end 10a of the lever arm 10 is in its high position arranged to be supported against the chassis of the trailer 1. In FIG. 3, the transversal beam 1d of the chassis of the trailer 1 is provided with support members such as brackets 21, against which the lever arm 10, particularly its free end 10a and its coupling member 7b, rest in the high position. If necessary, the brackets 21 can be provided with locking members, or they can be replaced by a locking member, for instance a bolt and an bolt pin.

The means 5 for raising and lowering the rear end of the trailer 1 are described with reference to the embodiments of FIGS. 4 and 5.

The support legs 12 of the trailer 1 comprise two elongate leg members 12a, 12b. The device for turning the support legs 12 includes two pressure fluid cylinders, advantageously hydraulic cylinders 14; 14a, 14b; 14c, 14d for each leg member 12a, 12b respectively. Each leg member 12a, 12b is arranged and attached to the side of the trailer 1, to the chassis thereof, behind the rearmost wheels 2a of the bogie 2. Each leg member 12a, 12b is either separately or simultaneously turnable around its coupling point, such as the axis 23, from the high position in the vicinity of the chassis of the trailer 1, to the low position, at the angle $\beta$ against the ground or other underlaying surface (marked with dotted lines in FIG. 4) in order to bring the rear end 1b of the trailer 1 to the support of the support legs 12. Respectively, the support legs 12 are turnable in the opposite direction when the rear end 1b of the trailer 1 is desired to be lowered or shifted from the support of the support legs 12 to the support of the bogie 2, the loading platform, the ground etc.

The hydraulic cylinders 14a, 14b; 14c, 14d are attached, when seen from the side, to each leg member at the point 24, and to the chassis of the trailer 1 at the point 25. The hydraulic cylinders are turnably attached, at the articulation point 24 and by means of the turning axes 24a, 24b, to the leg member 12a, 12b. The articulation point 24 of the hydraulic cylinders 14a, 14b; 14c, 14d and the leg member 12a, 12b, and respectively the articulation point 22 of the leg member 12a, 12b and the chassis of the trailer 1, are arranged at the distance c from each other when seen from the side of the trailer in FIG. 4. The line E—E passing through the two articulation points 22, 24 is at least roughly vertical to the main lengthwise axis of the leg members 12a, 12b. The distance c between the articulation points 22, 24 is essentially shorter than the total length d of the leg member.

The hydraulic cylinders 14a, 14b; 14c, 14d are advantageously short standard-type cylinders, just as the cylinders used in the means 4 at the front end 1a of the trailer 1. They are installed in connection with the leg members 12a, 12b and the chassis of the trailer 1 so that the torque directed to the support legs 12 is as large as possible and distributed evenly throughout the whole turning range, from the high position to the low position.

Figure 4:
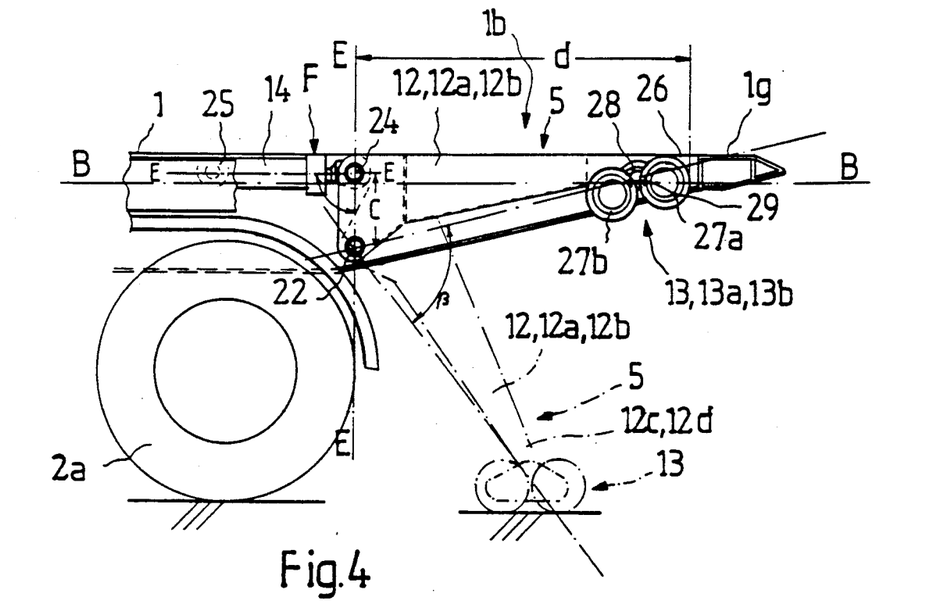
FIG. 4 is a detailed illustration of the means for raising and lowering the rear end of the semitrailer, seen from the side in partial cross-section.
Figure 5:
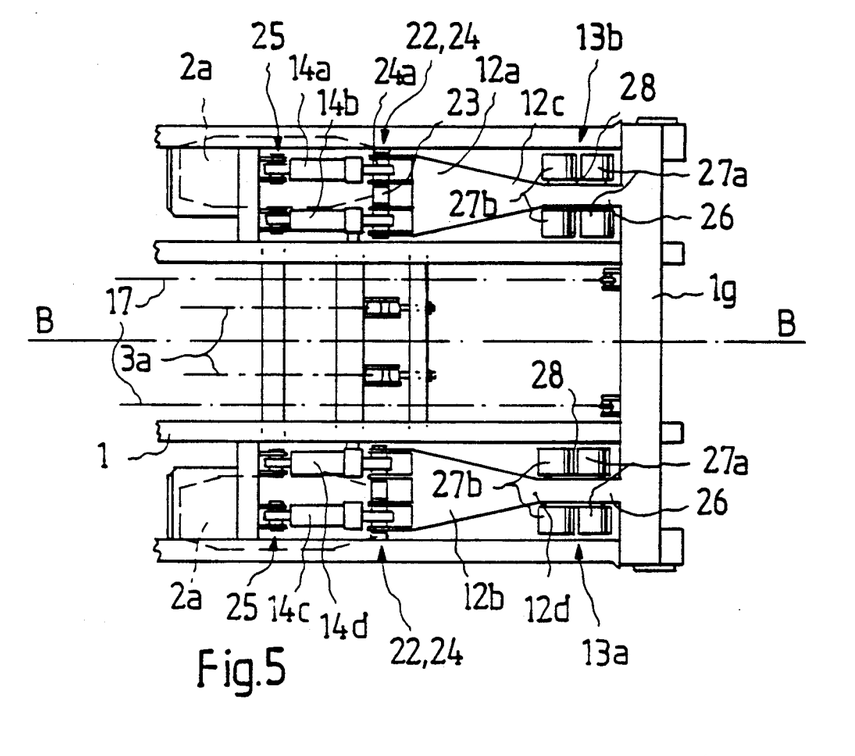
FIG. 5 is a detailed illustration of the means for raising and lowering the rear end of the semitrailer, seen from the top.

In the high position and seen from the side, the hydraulic cylinders 14a, 14b; 14c, 14d and the support legs 12 are located successively and roughly parallelly, as is seen from FIG. 4, and in such a position that the free ends 12c, 12d of the support legs are directed towards the rear end 1b of the trailer 1. Moreover, the free end 12c, 12d of each leg member 12a, 12b is in the high position located in the immediate vicinity of the rear edge of the trailer chassis, in this case the rear beam 1g. Thus one elongate side of the leg member 12a, 12b is in the high position located near the top level F of the chassis structure. If the rear end 1b of the trailer is beveled so that it narrows towards the read edge, i.e. towards the rear beam 1g, then each leg member 12a, 12b can be arranged in this beveled part of the rear end 1b of the trailer.

The free end 12c, 12d of each leg member 12a, 12b is in the high position arranged to be supported against the rear end of the trailer. In FIGS. 4 and 5, the rear beam 1g of the trailer is provided with support members, such as brackets 26, against which the leg member, particularly its free end 12c, 12d rests in the high position.

At the free end 12c, 12d of each leg member 12a, 12b there is attached a bogie 13a, 13b. The bogie 13a, 13b is attached turnably to the leg member, so that it is free to move at least in the turning direction of the leg member, and can thus be supported against the ground at the various position angles β of the leg member.

The bogie 13; 13a, 13b of each leg member 12a, 12b is advantageously formed of two pairs of wheels 27a, 27b, which are attached to the bogie support 28. This bogie support 28 in turn is turnably attached to the free end 12c, 12d of the leg member 12a, 12b, at the articulation axis 29.

The leg members 12a, 12b of the apparatus are advantageously arranged in the chassis of the trailer 1, so that the wheels 27a, 27b of the bogie 13; 13a, 13b are at least partly outside the bottom part of the trailer chassis 1 while the leg members are in the high position (cf. FIG. 4).

The trailer of the invention is operated as follows. Let us observe FIG. 6. Let us assume that the vehicle-trailer combination is without the load 9. When beginning the loading process, the support legs 12 are turned from the high position in the vicinity of the trailer chassis to the low position. When the support legs 12 rest against the ground, the bogie 13 is shifted, in the lengthwise direction of the trailer, from the rear end 1b to the front end 1a by employing the means 3. The lever arm 10 is turned, by means of the hydraulic cylinders 11a, 11b, to an angle with respect to the trailer chassis, in which case the front end 1a of the trailer rises, with respect to the tractor 8, without disengaging the coupling members 7; 7a, 7b from each other. Thereafter the rear end 1b of the trailer is brought to the same height as the loading platform 30 by suitably turning the support legs 12. The means 6, particularly the transfer cradle 15 for shifting the load to the support of the trailer, are shifted from the front end 1a of the trailer to the rear end 1b, whereafter the transfer cradle 15 is attached to the container 9. Now the container 9 can be pulled, by means of the transfer cradle 15, to the support of the trailer 1, as is seen from FIG. 6. The above described steps, as for the support legs 12, the bogie 2 and the lever arm 10 are repeated in reversed order, whereafter the vehicle-trailer combination complete with load is ready for transport, as is seen from FIG. 1.

Figures 6, 8:
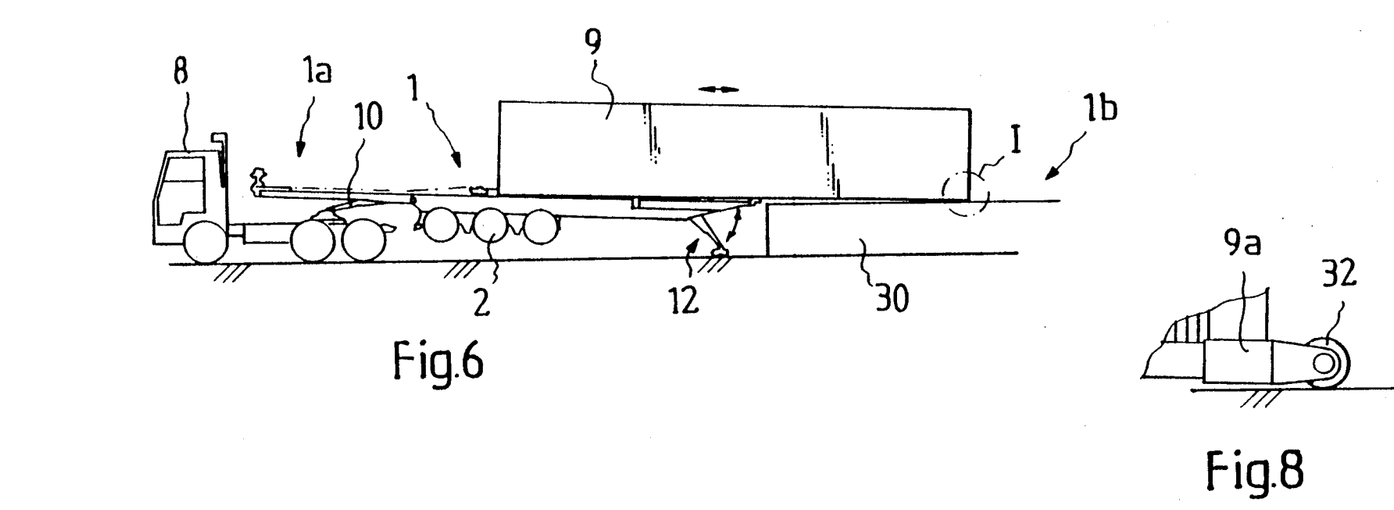
FIG. 6 illustrates the vehicle-semitrailer combination of FIG. 1 at the loading and/or unloading stage of the container, where a loading platform is utilized.
FIG. 8 illustrates a shifting wheel provided at the end of the container.
Figure 7:
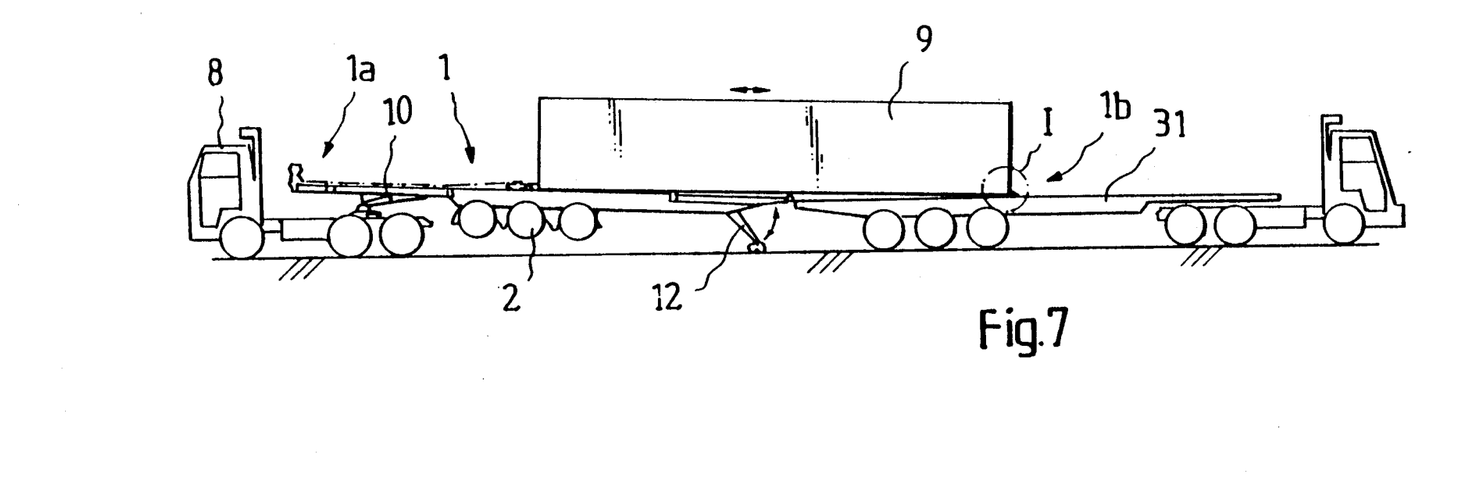
FIG. 7 illustrates the shifting of a container from the semitrailer of the invention to another trailer.

FIG. 7 illustrates an advantageous form for using the semitrailer 1. In this case, the trailer 1 of the invention is used for unloading an ordinary trailer 31. The unloading of a container from the ordinary trailer 31, as well as its loading into the said trailer, is in principle carried out in the same fashion as was described above, in connection with FIG. 6. Instead of the loading platform 30, the loading to the semitrailer of the invention takes place from another trailer 31. This kind of use is particularly advantageous when transporting big loads for long distances, because one semitrailer 1 of the invention can roll along a vehicle caravan. By means of it, large numbers of ordinary trailers can be loaded and unloaded without container cranes or other such auxiliary equipment.

In the embodiments of FIGS. 6 and 7, the bottom corners 9a of the container 9 are provided with transfer wheels 32. Supported by these wheels, the moving of the rear end of the container is carried out flexibly, and without damaging the loading platform 30 or another trailer.

It is pointed out that the rear end 1b of the semitrailer 1 can be lifted higher than where it is while resting on the rear bogie 2. This depends on the length d of the leg members 12; 12a, 12b. On the other hand, the rear end 1b of the trailer can be lowered, after shifting the rear bogie 2, against the ground by lowering the pressure in the pressure fluid cylinders 14a, 14b; 14c, 14d, and by allowing the leg members 12a, 12b to turn around their coupling point towards the rear end 1b of the trailer. The container to be loaded from the ground is thus brought to the support of the trailer by shifting the trailer, by means of the bogies 2, to under the container 9. The unloading takes place in an opposite order.

By changing the pressure in the hydraulic cylinders 14a, 14b; 14c, 14d of only one leg member 12a, 12b, the sideways inclination of the trailer can, if necessary, be adjusted for instance in order to compensate the unevenness of the underlaying surface. When the free ends 12c, 12d of the leg members 12a, 12b of the apparatus are provided with bogies 13a, 13b, the trailer 1 can be moved, by means of the tractor 8, from one place to another.

The invention is not restricted to the above described preferred embodiment exclusively, but many changes are possible within the scope of the inventional idea defined in the appended patent claims.

We claim:

1. A semitrailer (1) comprising means (6) for shifting a load, such as a container (9), to a support of the trailer (1), and away from the support thereof; as well as means (3) for shifting a bogie (2) in a lengthwise direction of the trailer and means (10, 11; 12, 14) for raising and lowering both a front end (1a) and a rear end (1b) of the trailer, characterized in that the means for raising the front end (1a) of the semitrailer (1) include a lever arm (10), a free end (10a) whereof is directed towards the front end of the trailer (1), and at least one power unit, such as a pressure fluid cylinder (11; 11a, 11b) which is located in connection with the trailer (1), on an opposite side of the articulation point (20) of the lever arm (10), with respect to the said lever arm (10);

the means for raising and lowering the rear end (1b) of the semitrailer 1), comprise support legs (12) including leg members (12a, 12b), which are attached, at an articulation point (22), at such a distance from the rear end (1b) of the trailer that roughly corresponds to a total length (b) of the leg member, so that a free end (12c, 12d) of the leg member (12a, 12b) is in a high position located in an immediate vicinity of a rear edge (1g) of the rear end (1b) of the trailer; and at least one power unit, such as a pressure fluid cylinder (14; 14a, 14b, 14c, 14d), which is placed in the trailer (1), on an opposite side of the articulation point (22) with respect to the leg member (12a, 12b), by aid of which means the front and rear ends of the trailer can be raised and lowered irrespective of each other for loading and unloading the trailer.

2. The semitrailer of claim 1, characterized in that a second articulation point (18) of the front end pressure fluid cylinder (11; 11a, 11b), which point is connected to the lever arm (10), is located at a distance (a) from the articulation point (20) of the lever arm and above it, while the lever arm is in a high position.

3. The semitrailer of claim 1, characterized in that the front end pressure fluid cylinder (11) and the lever arm (10) are in a high position located successively and at least roughly parallelly.

4. The semitrailer of claim 1, characterized in that a second articulation point (24) of the rear end pressure fluid cylinder (14; 14a, 14b, 14c, 14d), which point (24) is connected to the support legs (2), is located at a distance (a) from an articulation point (21) of the leg members (12a, 12b) and below the said point (21) when the leg members (12a, 12b) are in the high position.

5. The semitrailer of claim 4, characterized in that each rear end pressure fluid cylinder (14; 14a, 14b, 14c, 14d) and leg member (12a, 12b) are in the high position located successively and at least roughly parallelly.

6. The semitrailer of claim 6, characterized in that each leg member (12a, 12b) is arranged in a beveled part at the rear end (1b) of the trailer.

7. The semitrailer of claim 4, characterized in that to the free end (12c, 12d) of each leg member (12a, 12b), there is turnably attached a bogie (13; 13a, 13b).

8. The semitrailer of claim 7, characterized in that wheels (27a, 27b) of the bogie (13; 13a, 13b) are at least partly located outside a bottom part of a trailer chassis while the leg members (12a, 12b) are in the high position.

* * * * *

UNITED STATES PATENT AND TRADEMARK OFFICE
CERTIFICATE OF CORRECTION

PATENT NO. : 5,173,028  
DATED : December 22, 1992  
INVENTOR(S) : Jaakko Heikkinen, et al Page 1 of 2

It is certified that error appears in the above-identified patent and that said Letters Patent is hereby corrected as shown below:

TITLE PAGE:
Abstract, lines 3, 5, 7 and 9, "devices" should read --means--

Column 4, line 13, "Without" should read --without--

Column 4, line 13, "When" should read --when--

Column 5, line 2, "1b" should read --1b--

Column 9, line 5, "a" should read --the--

Column 9, line 7, "a bogie" should read --the bogie--

Column 9, line 7, "in a" should read --in the--

Column 9, line 9, "a front" should read --the front--

Column 9, line 9, "a rear" should read --the rear--

Column 9, lines 13, 25, 26 and 29, "a" should read --the--

Column 9, lines 17, 27 and 32, "an" should read --the--

Column 9, line 23 "an" should read --their--

Column 9, line 34, insert --the-- after the word "by"

Column 10, line 3, "a" should read --the--

UNITED STATES PATENT AND TRADEMARK OFFICE
CERTIFICATE OF CORRECTION

PATENT NO. : 5,173,028

DATED : December 22, 1992

INVENTOR(S) : Jaakko Heikkinen, et al

It is certified that error appears in the above-identified patent and that said Letters Patent is hereby corrected as shown below:

Column 10, lines 3, 8, 11, 13 and 25 "a" should read --the--

Column 10, line 32, "a bottom" should read --the bottom--

Column 10, line 32, "of a" should read --of the--

Column 10, lines 4 and 10, delete "front end" after the word "the"

Column 10, line 14, delete "rear end" after the word "the"

Column 10, line 21, delete "rear end" after the word "each"

Column 10, line 31, insert --the-- after the word "that"

Signed and Sealed this

Fourteenth Day of December, 1993

Attest:

BRUCE LEHMAN

*Attesting Officer*         *Commissioner of Patents and Trademarks*